(12) United States Patent
Hillmering

(10) Patent No.: US 6,559,778 B1
(45) Date of Patent: *May 6, 2003

(54) ALPHANUMERICAL KEYBOARD

(75) Inventor: Christer Hillmering, Sollentuna (SE)

(73) Assignee: Minec Systems Investment AB, Taby (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 397 days.

(21) Appl. No.: 08/973,003

(22) PCT Filed: Mar. 22, 1996

(86) PCT No.: PCT/SE96/00367

§ 371 (c)(1),
(2), (4) Date: Jan. 2, 1998

(87) PCT Pub. No.: WO96/38776

PCT Pub. Date: Dec. 5, 1996

(30) Foreign Application Priority Data

May 30, 1995 (SE) .............................................. 9501978

(51) Int. Cl.⁷ .............................................. H03K 17/94

(52) U.S. Cl. ............................ 341/23; 341/22; 345/169; 708/146

(58) Field of Search ...................... 341/22, 23; 345/169; 708/145, 146

(56) References Cited

U.S. PATENT DOCUMENTS

| | | | | |
|---|---|---|---|---|
| 4,381,502 A | * | 4/1983 | Prame | 341/22 |
| 4,549,279 A | | 10/1985 | Lapeyre | |
| 4,891,777 A | * | 1/1990 | Lapeyre | 708/145 |
| 4,897,649 A | | 1/1990 | Stucki | |
| 5,007,008 A | * | 4/1991 | Beers | 341/22 |
| 5,117,455 A | | 5/1992 | Danish | |
| 5,339,358 A | | 8/1994 | Danish et al. | |
| 5,612,690 A | * | 3/1997 | Levy | 341/22 |

* cited by examiner

*Primary Examiner*—Timothy Edwards, Jr.
(74) *Attorney, Agent, or Firm*—Young & Thompson

(57) ABSTRACT

An alphanumerical keyboard which includes a plurality of numeral keys and function keys is programmed so that an alpha-character will always be generated when exactly two mutually adjacent keys are depressed simultaneously, and that a numeral will always be generated when only one numeral key is depressed.

7 Claims, 1 Drawing Sheet

ALPHANUMERICAL KEYBOARD

BACKGROUND OF THE INVENTION

The present invention relates to an alphanumerical keyboard, which includes a plurality of numeral keys and function keys. The invention is primarily applicable to keyboards of limited size and having a limited number of keys, and then particularly with keyboards for hand-held computers and mobile telephones.

DESCRIPTION OF THE RELATED ART

A number of alphanumerical keyboards are known to the art which function in a numeral mode and in an alphabet mode when appropriate keys are depressed; see for instance U.S. Pat. Nos. 4,549,279, 4,994,992, 5,117,455 and 5,339,358 in this regard. The first two of the aforesaid U.S.-patent specifications also teach a keyboard in which simultaneous depression of up to four mutually adjacent keys is utilized to create as many functions as possible with as few keys as possible. Although a keyboard of this construction is compact, it is also difficult to grasp, i.e. is not easily managed and therewith not particularly user friendly. The two latter U.S.-patent specifications mentioned above teach keyboards in which pairs of mutually adjacent keys are used to generate certain letters or alpha-characters when the keys of said pairs are depressed one after the other.

SUMMARY OF THE INVENTION

The object of the present invention is to provide an alphanumerical keyboard of limited size and having a limited number of keys which is both user friendly and which will enable numerals and alpha-characters to be generated alternately by pressing one or more keys with only one finger of one hand and without using a shift key.

These objects are achieved in accordance with the invention with an alphanumerical keyboard of the aforedefined kind which is characterized in that the keyboard is programmed so that when two mutually adjacent keys are depressed simultaneously one alpha-character will always be generated while a numeral will always be generated when depressing only one numeral key. Because numerals are always generated by depressing only one key and letters are generated by depressing two mutually adjacent keys simultaneously, a user will find it very easy to separate these functions and to quickly key-indata that contains both numerals and letters or alpha-characters. Because the keys are separated from one another, there is also less risk of a user unintentionally depressing two adjacent keys simultaneously.

According to one preferred embodiment of the invention, the numerals and the alpha-characters are generated when a single key or two keys return from a depressed position, and wherein depression of one key will activate search means, or scanning means, which investigate whether an adjacent key is depressed over a given time duration.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
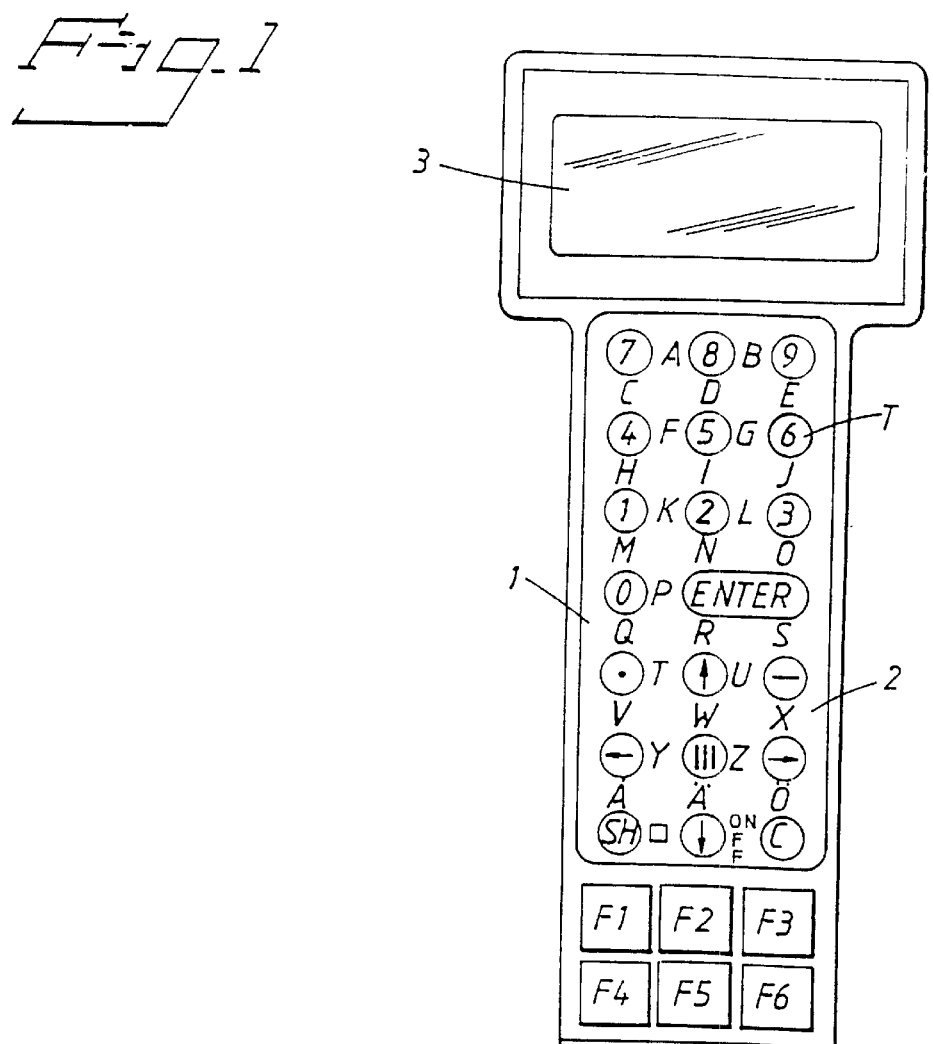
FIG. 1 is a front view of a hand-held computer provided with a keyboard according to one embodiment of the invention.

The hand-held computer illustrated in FIG. 1 includes an inventive keyboard 1. The keyboard includes twenty keys T which are mutually spaced in seven rows and three columns. The ten uppermost keys in FIG. 1 are numeral keys, whereas the remaining ten keys are function keys. The keys T are shown as round rings in the figure, and are conventionally marked with the numeral that is generated for the function that takes place when the key in question is depressed. The letters A–Ö are printed on the keyboard casing 2 in the spaces between adjacent keys in the rows and columns.

The keyboard 1 is programmed so that when two mutually adjacent keys are depressed a letter will be generated. Thus, when the keys 7 and 8 are depressed simultaneously, the letter A will be generated, while simultaneous depression of the numeral keys 7 and 4 generates the letter C. Because letters, or alpha-characters, are always generated when two adjacent keys are depressed simultaneously, a user is able to learn to use the keyboard very quickly, and that once having become well acquainted with the keyboard there is relatively no risk of the user using the keys wrongly. Furthermore, an alphanumerical expression can be keyed-in without using a SHIFT-key and by only depressing one or two keys for each character to be generated, therewith enabling such expressions to be written-in quickly and with the same positive degree as when writing-in solely numeral expressions. Because the pairs of keys that generate letters are comprised of two mutually adjacent keys, they can be depressed simultaneously with only one finger, provided of course that the keys are not spaced too far apart.

The hand-held computer illustrated in FIG. 1 is constructed to enable alphanumerical characters to be written-in with the aid of the thumb of the same hand that holds the computer. In order to facilitate this, the keys will preferably not be located too close together, since this would make depression of only one key difficult to achieve and would therewith increase the risk of unintentionally depressing two keys simultaneously.

Figure 2:
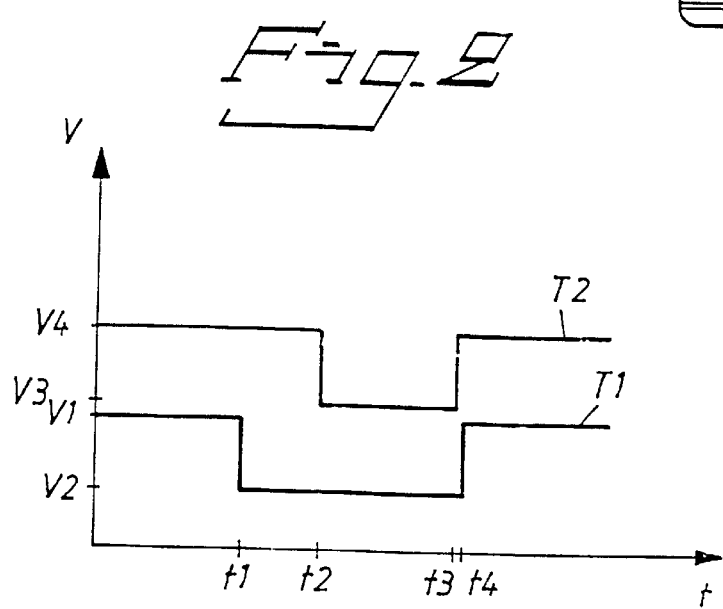
FIG. 2 illustrates schematically an example of signal development when depressing two keys simultaneously.

In this document, simultaneous depression of two adjacent keys means that two keys are depressed by virtue of continuous finger movement. In such movement, it is not unusual that the finger used will touch one key momentarily before touching the other key, and depression of the two keys does not in reality occur at precisely the same point in time. FIG. 2 illustrates schematically the voltage V as a function of time t in respect of the keys T1 and T2, for instance the numeral keys 1 and 2, the depression of said keys generating a letter, e.g. the letter K. When the keys T1, T2 are depressed at the time point t1 and t2 respectively, the voltage will fall from the value V1 to the value V2, and from the value V4 to the value V3 respectively, and when the keys are released at respective time points t4 and t3, the voltage will increase to respective values V1 and V4. In the illustrated case, the user's finger first touches the key T1 and then very shortly after touches the key T2, whereas said keys T1, T2 are released practically at the same time.

In order to establish whether or not depression of a key relates to an alpha-character, a key searching program is initiated each time a key bottoms, i.e. the voltage falls to its bottom value, wherein at least the keys adjacent the depressed key are investigated over a given time period in order to establish whether or not one of these keys has been depressed. If no other key has bottomed during this searching period, the numeral or function of the depressed key is stored, and when the key is released the stored character is written-in, i.e. when the voltage returns to its earlier values. On the other hand, if one of the keys adjacent to the depressed key is also found to be depressed within said searching period, a letter is stored and written-in when the keys are released. The program ignores depression of another key after completion of the searching period. The search is broken-off when detecting depression of another key.

Thus, in order for depression of the keys T1, T2 to result in a letter being written-in, as illustrated in FIG. 2, the searching period must have a time duration which is equal to or longer than the time difference t2–t1. It has been found that this time difference will conveniently lie in the range of 10–500 ms, preferably in the range of 50–200 ms.

It is also possible to program-in an execution time for writing-in a character some time after the search has been broken-off, either because the time period has expired or because it is detected that another key has been depressed.

This means that the character will be written-in after a given time period has lapsed, irrespective of whether the key or keys has/have been released or not. It is also possible to prescribe that the key or keys shall be depressed for a given length of time before the character is written-in.

The hand-held computer shown in FIG. 1 includes a display 3 and an array of function keys F1–F6. If wishing to extend the number of functions without increasing the number of keys, it is, of course, possible to use other key combinations than those aforedescribed in order to program-in such functions and to adapt the search facility accordingly.

As will be understood, the described embodiment of the keyboard can be modified within the scope of the invention. For instance, the configuration of the keyboard and the key arrangement may be different to that shown. For instance, the keyboard may be circular and the keys arranged in concentrically circles. The keyboard may also be programmed so that numerals are written-in when a key T is released from its depressed bottoming position, and letters written-in directly when the searching means detect that two keys have been depressed simultaneously. The invention is therefore restricted solely by the content of the following claims.

What is claimed is:

1. An alphanumerical keyboard comprising a plurality of numeral keys and function keys, wherein the keyboard is programmed so that only simultaneous depression of exactly two mutually adjacent keys will generate an alpha-character and so that only depression of solely one numeral key will generate a numeral, wherein simultaneous depression requires both of the exactly two mutually adjacent keys to be in a depressed state at the same time.

2. A keyboard according to claim 1, characterized in that the alpha-character that is generated when two adjacent keys (T) are depressed simultaneously is marked on the keyboard casing (2) between relevant pairs of keys (T).

3. A keyboard according to claim 1, characterized in that the numerals and alpha-characters are generated as a key (T) or two keys returns/return from a depressed position.

4. A keyboard according to claim 3, characterized by a searching means which is initiated by the depression of a key (T1) such as to investigate over a predetermined period of time whether an adjacent key (T2) is depressed.

5. A keyboard according to claim 1, characterized in that the numerals are generated at the return of a key (T) from a depressed position, and that alpha-characters are generated when two keys (T) are depressed simultaneously.

6. A keyboard according to claim 5, characterized by a searching means which is initiated by the depression of a key (T1) such as to investigate over a predetermined period of time whether an adjacent key (T2) is depressed.

7. An alphanumerical keyboard comprising:

a matrix of row and column keys, said keyboard being programmed to require depression of a single one of said keys to generate a numeral, said keyboard being programmed to limit generation of alpha-characters responsive to only the depression of exactly two adjacent of said keys, wherein said two adjacent keys are two adjacent row keys or two adjacent column keys, wherein simultaneous depression requires both of the exactly two mutually adjacent keys to be in a depressed state at the same time.

* * * * *